United States Patent
Fontaine et al.

(10) Patent No.: US 12,465,581 B2
(45) Date of Patent: Nov. 11, 2025

(54) COMPOSITIONS FOR IMPROVING GUT HEALTH AND/OR MILK PRODUCTION IN RUMINANTS, USES AND METHODS THEREOF

(71) Applicant: JEFO NUTRITION INC., Saint-Hyacinthe (CA)

(72) Inventors: Jean Fontaine, Saint-Hyacinthe (CA); Jean-Daniel Bunod, Saint-Hyacinthe (CA); Ousama Alzahal, Saint-Hyacinthe (CA); Abdallah Zankar, Saint-Hyacinthe (CA); Essi Evans, Saint-Hyacinthe (CA); Elizabeth Santin, Saint-Hyacinthe (CA); Ludovic Lahaye, Saint-Hyacinthe (CA); Emilie Fontaine, Saint-Hyacinthe (CA)

(73) Assignee: JEFO NUTRITION INC., Saint-Hyacinthe (CA)

( * ) Notice: Subject to any disclaimer, the term of this patent is extended or adjusted under 35 U.S.C. 154(b) by 0 days.

(21) Appl. No.: 18/834,538

(22) PCT Filed: Feb. 2, 2023

(86) PCT No.: PCT/CA2023/050140
§ 371 (c)(1),
(2) Date: Jul. 30, 2024

(87) PCT Pub. No.: WO2023/147665
PCT Pub. Date: Aug. 10, 2023

(65) Prior Publication Data
US 2025/0108025 A1    Apr. 3, 2025

Related U.S. Application Data

(60) Provisional application No. 63/305,972, filed on Feb. 2, 2022.

(51) Int. Cl.
*A61K 35/74* (2015.01)
*A61K 31/05* (2006.01)
(Continued)

(52) U.S. Cl.
CPC ............ *A61K 31/194* (2013.01); *A61K 31/05* (2013.01); *A61K 31/085* (2013.01); *A61K 31/11* (2013.01);
(Continued)

(58) Field of Classification Search
CPC ...................................... A61K 35/74
See application file for complete search history.

(56) References Cited

U.S. PATENT DOCUMENTS

2016/0302450 A1    10/2016    Albrecht et al.
2021/0307365 A1    10/2021    Ferket et al.

FOREIGN PATENT DOCUMENTS

| WO | 2006081588 A1 | 8/2006 |
| WO | 2012159186 A1 | 11/2012 |

(Continued)

OTHER PUBLICATIONS

English machine translation of Piao et al., CN 113796470 A, Dec. 17, 2021, 2021.*

(Continued)

*Primary Examiner* — Rosanne Kosson
(74) *Attorney, Agent, or Firm* — SMART & BIGGAR LP

(57) ABSTRACT

The present disclosure relates to compositions for improving gut health and/or milk production in ruminants, comprising: at least one organic acid chosen from sorbic acid, fumaric acid, malic acid, lactic acid, citric acid, formic acid, salts thereof and mixtures thereof; at least one essential oil chosen from thymol, eugenol, vanillin, thyme oil, carvacrol, cinnamaldehyde, clove leaf essential oil, and mixtures thereof; at least one bacterial fermentation product chosen from a (Continued)

Bacillus subtilis, Streptomyces, Aspergillus, Streptococcus fermentation product, a Streptomyces fermentation product, an Aspergillus fermentation product, a Streptococcus fermentation product, a Paenibacillus fermentation product and mixtures thereof; at least one plant extract chosen from a saponin extract, a Yucca extract, and mixtures thereof; and optionally at least one controlled release matrix.

23 Claims, 1 Drawing Sheet

(51) Int. Cl.

| | |
|---|---|
| A61K 31/085 | (2006.01) |
| A61K 31/11 | (2006.01) |
| A61K 31/19 | (2006.01) |
| A61K 31/194 | (2006.01) |
| A61K 31/7048 | (2006.01) |
| A61K 35/742 | (2015.01) |
| A61K 36/185 | (2006.01) |
| A61K 47/02 | (2006.01) |
| A61K 47/12 | (2006.01) |
| A61K 47/36 | (2006.01) |
| A61K 47/44 | (2017.01) |
| A61K 47/46 | (2006.01) |
| A61K 35/00 | (2006.01) |

(52) U.S. Cl.
CPC .......... *A61K 31/19* (2013.01); *A61K 31/7048* (2013.01); *A61K 35/742* (2013.01); *A61K 36/185* (2013.01); *A61K 47/02* (2013.01); *A61K 47/12* (2013.01); *A61K 47/36* (2013.01); *A61K 47/44* (2013.01); *A61K 47/46* (2013.01); *A61K 2035/115* (2013.01)

(56) References Cited

FOREIGN PATENT DOCUMENTS

| | | |
|---|---|---|
| WO | 2020142305 A1 | 7/2020 |
| WO | 2020146587 A1 | 7/2020 |
| WO | 2021011818 A1 | 1/2021 |

OTHER PUBLICATIONS

English machine translation of Ling, CN 107603920 A, 2018.*
Hausmann et al., "Effects of a combination of plant bioactive lipid compounds and biotin compated with monensin on body condition, energy metabolism and mild performance in transition dairy cows", Plos One, Mar. 27, 2018, pp. 1-20.
Mezzetti et al., "Effect of a feed additive containing yeast cell walls, clove and coriander essential oils and Hibiscus sabdariffa administered to mid-lactating dairy cows on productive performance, rumen fluid composition and metabolic conditions", Italian Journal of Animal Science, Dec. 29, 2021, vol. 21, No. 1, 86-96.
Zhang et al., "Research on the Applications of Calcium Propionate in Dairy Cows: A Review", Animals, Aug. 3, 2020, 10, 1336.
Pearlin et al., "Role of acidifiers in livestock nutrition and health: A review", J Anim Physiol Anim Nutr., Mar. 2020;104:558-569.
K. A. Beauchemin, "Invited review: Current perspectives on eating and rumination activity in dairy cows", J. Dairy Sci. 101:4762-4784, Jun. 2018.
Duffield et al., "Impact of hyperketonemia in early lactation dairy cows on health and production", J. Dairy Sci. 92:571-580, Feb. 2009.

\* cited by examiner

COMPOSITIONS FOR IMPROVING GUT HEALTH AND/OR MILK PRODUCTION IN RUMINANTS, USES AND METHODS THEREOF

CROSS-REFERENCE TO RELATED APPLICATIONS

The present disclosure is a 35 USC 371 national stage entry of PCT/CA2023/050140 filed on Feb. 2, 2023, and which claims priority to U.S. application No. 63/305,972 that was filed on Feb. 2, 2022. These documents are hereby incorporated by reference in their entirety.

FIELD

The present disclosure relates to compositions for ruminants and more particularly to compositions for improving gut health and/or milk production in ruminants.

BACKGROUND

For decades, the search for antibiotic alternatives or antibiotic-free growth promoters has been undertaken worldwide. Among these alternatives, organic acids (also referred to as acidifiers) are known to play an important role in improving gut health in animals. The organic acids may be used to favourably manipulate the intestinal microbial populations and improve the immune response, hence perform an activity similar to antibiotics in food animals in countering pathogenic bacteria. Organic acids also improve the digestibility of nutrients and increase the absorption of vitamins and minerals. The incorporation of organic acids also leads to thinning of the intestinal lining which facilitates better absorption of nutrients and its efficient utilization. However, their effect will not be similar among all types of organic acids as their activities depend on their dissociation parameters i.e. pKa values. Moreover, organic acids can reduce the diet palatability due to their bitter taste which requires the utilization of a targeted delivery approach for these organic acids to the site of action i.e. gut in order to improve animal performance. Coated acidifiers have been developed for use in food animals especially in pigs and poultry (Pearlin et al. J Anim Physiol Anim Nutr (Berl) 2020 March; 104 (2): 558-569).

Dairy cows and ruminants in general have a very unique digestive tract composed of 4 chambers or stomachs, the first of which is a massive rumen where microorganisms proliferate and degrade (ferment) fibrous forages and feedstuffs that cannot be digested by monogastric animals like pigs or chickens, for example. Therefore, any feed additive that is intended to act in the gut (small or large intestine) has to bypass the rumen and escape degradation by ruminal microbes.

Dairy cows experience an important shift in metabolism after calving, after which milk production typically increases so rapidly that feed intake alone cannot meet energy requirements. During the early lactation phase, cows with poor adaptive response to negative energy balance are at increased risk of metabolic disorders, e.g. subclinical ketosis. Cows that develop ketosis in early lactation are known to have impaired milk production and are at increased risk of other periparturient or postpartum diseases and health complications.

Accordingly there remains a need to develop compositions for improving gut health and/or milk production in ruminants, as well as for reducing the risk of health conditions occurring in the transition period and in particularly in the early lactation period.

SUMMARY

Accordingly, an aspect provided herein relates to a composition comprising:
- at least one organic acid chosen from sorbic acid, fumaric acid, malic acid, lactic acid, citric acid, formic acid, proprionic acid, butyric acid, phosphoric acid, acetic acid, salts thereof and mixtures thereof;
- at least one essential oil chosen from thymol, eugenol, vanillin, thyme oil, carvacrol, cinnamaldehyde, clove leaf essential oil, and mixtures thereof;
- at least one bacterial fermentation product chosen from a *Bacillus* fermentation product, a *Streptomyces* fermentation product, an *Aspergillus* fermentation product, a *Streptococcus* fermentation product, a *Paenibacillus* fermentation product and mixtures thereof;
- at least one plant extract chosen from a saponin extract, a *Yucca* extract, and mixtures thereof; and
- optionally at least one controlled release matrix.

Accordingly, another aspect provided herein relates to a mixture comprising:
- a first composition comprising:
  - at least one organic acid chosen from sorbic acid, fumaric acid, malic acid, lactic acid, citric acid, formic acid, proprionic acid, butyric acid, phosphoric acid, acetic acid, salts thereof and mixtures thereof,
  - at least one essential oil chosen from thymol, eugenol, vanillin, thyme oil, carvacrol, cinnamaldehyde, clove leaf essential oil, and mixtures thereof, and
  - optionally a first controlled release matrix;
- a second composition comprising:
  - at least one bacterial fermentation product chosen from a *Bacillus* fermentation extract, a *Streptomyces* fermentation extract, an *Aspergillus* fermentation product, a *Streptococcus* fermentation product, a *paenibacillus* fermentation product and mixtures thereof, and
  - optionally a second controlled release matrix; and
- a third composition comprising:
  - at least one plant extract chosen from a saponin extract, a *Yucca* extract, and mixtures thereof, and optionally a third controlled release matrix.

In another aspect, there is provided herein a mixture comprising:
- a first composition comprising fumaric acid, sorbic acid, citric acid, malic acid, thymol, eugenol; vanillin and optionally a first controlled release matrix;
- a second composition comprising a *Bacillus amyloliquefaciens* fermentation extract, a *Bacillus subtilis* fermentation extract; a *Streptomyces* fermentation extract and optionally a second controlled release lipid matrix; and
- a third composition comprising a saponin extract and optionally a third controlled release matrix.

Another aspect relates to uses of the composition or mixture herein described for improving milk production and/or gut health, optionally rumen function and/or microflora balance, and reducing the risk of subclinical ketosis and/or ketosis in a ruminant.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

DETAILED DESCRIPTION

Figure 1:
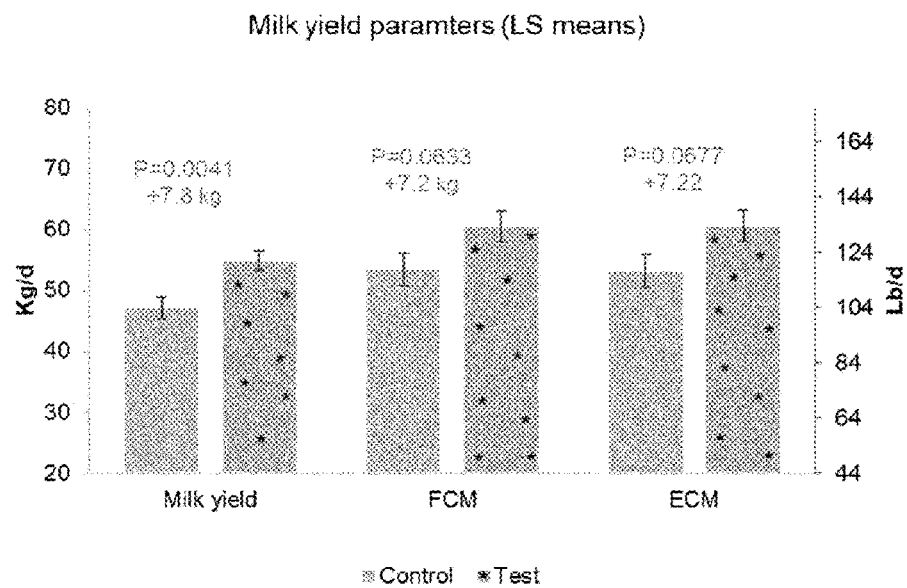
FIG. 1 is a bar graph showing the Least Square means for milk yield, fat-corrected milk (FCM) yield, and energy corrected milk (ECM) yield in control cows (left bars) and test cows (right bars).

Unless otherwise indicated, the definitions and examples described herein are intended to be applicable to all embodiments and aspects of the present disclosure herein described for which they are suitable as would be understood by a person skilled in the art.

The term "ruminant" as used herein means an even-toed hoofed animal which has a complex 3- or 4-chamber stomach and which typically rechews what it has previously swallowed. Ruminants referred to herein include, without limitation, cattle, sheep, goats, oxen, musk ox, llamas, alpacas, guanicos, deer, bison, antelopes, camels, and giraffes.

As used herein, the term "controlled release matrix" refers to a substance or mixture of substances that is used to encapsulate compounds, for example bioactive compounds, such as organic acids, essential oils, fermentation and/or plant extracts. Encapsulation with a controlled release matrix such as a lipid matrix provides a physical barrier for such compounds, separating the core material from the environment until release, and may therefore improve the stability of the compounds and enable slow release thereof. In the context of ruminants such as cows, encapsulated (or microencapsulated) compounds administered orally may therefore bypass degradation in the rumen and be available for intestinal absorption. The matrix material may be vegetable oil (e.g. hydrogenated vegetable oil) or animal oil. The matrix may also comprise silica, silicic acid, calcium carbonate, limestone, yeast extract, palmitic acid, stearic acid, maltodextrin and mixtures of the foregoing.

As used herein, the term "substantially" means that the difference in strength properties is 10% or less, preferable 5% or less or more preferably 1% or less.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The term "consisting" and its derivatives, as used herein, are intended to be closed ended terms that specify the presence of stated features, elements, components, groups, integers, and/or steps, and also exclude the presence of other unstated features, elements, components, groups, integers and/or steps.

Further, terms of degree such as "substantially", "about" and "approximately" as used herein mean a reasonable amount of deviation of the modified term such that the end result is not significantly changed. These terms of degree should be construed as including a deviation of at least +5% of the modified term if this deviation would not negate the meaning of the word it modifies.

The term "% wt." or "wt. %" as used herein when describing an ingredient present in a mixture or composite, refers to the weight % of this ingredient based on the total weight of the mixture or composite.

More specifically, the term "about" means plus or minus 0.1 to 50%, 5-50%, or 10¬40%, 10-20%, 10%-15%, preferably 5-10%, most preferably about 5% of the number to which reference is being made.

As used in this specification and the appended claims, the singular forms "a", "an" and "the" include plural references unless the content clearly dictates otherwise. Thus for example, a composition containing "a compound" includes a mixture of two or more compounds. It should also be noted that the term "or" is generally employed in its sense including "and/or" unless the content clearly dictates otherwise.

The definitions and embodiments described in particular sections are intended to be applicable to other embodiments herein described for which they are suitable as would be understood by a person skilled in the art.

The recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

Further, the definitions and embodiments described in particular sections are intended to be applicable to other embodiments herein described for which they are suitable as would be understood by a person skilled in the art. For example, in the following passages, different aspects of the disclosure, are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As detailed in the Example, it has been determined that a mixture of compositions that comprise a blend of organic salts, essential oils, fermentation extracts and plant extracts, when administered to cows during their transition period, may improve gut health and/or milk production.

It was previously demonstrated in US Patent Publication Number US20210307365A1, herein incorporated by reference in its entirety, that micro-encapsulation of feed ingredients allows for their assimilation by the ruminant (e.g. cow) post-ruminally, without being altered by the microorganisms of the rumen. Based on a specific matrix of triglycerides and technological ingredients, the matrix described in US20210307365A1 has demonstrated its efficacy with rumen bypass of amino acids and vitamins in particular. As presently demonstrated, using the encapsulation method, organic acids in combination with other components were delivered at the intestinal level, in a non-dissociated form, in order to create a favorable environment for ideal microbiota and gut health. In addition to organic acids, a blend of essential oils which acts in synergy with organic acids to create unfavourable environment for pathogenic bacteria and thus better control of those pathogens. Furthermore, the composition herein disclosed also comprises fermentation extracts and plant extracts with recognized biological activities, with the intention to improve overall feed digestion and gut health.

Accordingly, the present disclosure provides a composition that may improve gut health, optionally feed digestion, rumen function and/or microflora balance, and/or milk production in ruminants. The present disclosure also discloses a composition that may reduce the risk of subclinical ketosis in early lactation.

The composition comprises at least one organic acid.

For example, the at least one organic acid or salt thereof is chosen from sorbic acid, fumaric acid, malic acid, lactic acid, citric acid, formic acid, proprionic acid, butyric acid, phosphoric acid, acetic acid, salts thereof and mixtures thereof.

The composition can in some embodiments comprise 2, 3, 4 or more organic acids or salts thereof.

For example, the composition comprises sorbic acid, fumaric acid, malic acid and citric acid.

For example, the composition comprises about 10 to about 60 wt. % of the at least one organic acid. For example, the composition comprises about 15 to about 50 wt. % of the at least one organic acid. For example, the composition comprises about 20 to about 40 wt. % of the at least one organic acid. For example, the composition comprises about 25 to about 35 wt. % of the at least one organic acid.

For example, the composition comprises about 1 to about 20 wt. % of sorbic acid or potassium sorbate. For example, the composition comprises about 1 to about 10 wt. % of sorbic acid or potassium sorbate. For example, the composition comprises about 5 to about 10 wt. % of sorbic acid or potassium sorbate.

For example, the composition comprises about 1 to about 40 wt. % of fumaric acid, calcium formate or calcium propionate. For example, the composition comprises about 5 to about 30 wt. % of fumaric acid, calcium formate or calcium propionate. For example, the composition comprises about 5 to about 20 wt. % of fumaric acid, calcium formate or calcium propionate.

For example, the composition comprises about 1 to about 20 wt. % of malic acid or lactic acid. For example, the composition comprises about 1 to about 10 wt. % of malic acid or lactic acid. For example, the composition comprises about 5 to about 10 wt. % of malic acid or lactic acid.

For example, the composition comprises about 1 to about 20 wt. % of citric acid or formic acid. For example, the composition comprises about 1 to about 10 wt. % of citric acid or formic acid. For example, the composition comprises about 5 to about 10 wt. % of citric acid or formic acid.

The composition also comprises at least one essential oil.

For example, the at least one essential oil is chosen from thymol, vanillin, eugenol and mixtures thereof.

For example, the composition comprises thymol, vanillin and eugenol.

For example, the composition comprises about 0.1 to about 10 wt. % of the at least one essential oil. For example, the composition comprises about 0.1 to about 5 wt. % of the at least one essential oil. For example, the composition comprises about 0.1 to about 3 wt. % of the at least one essential oil. For example, the composition comprises about 0.1 to about 1 wt. % of the at least one essential oil.

For example, the composition comprises about 0.1 to about 5 wt. % thymol, thyme oil or carvacrol. For example, the composition comprises about 0.1 to about 3 wt. % thymol, thyme oil or carvacrol. For example, the composition comprises about 0.1 to about 1 wt. % thymol, thyme oil or carvacrol.

For example, the composition comprises about 0.1 to about 5 wt. % vanillin or cinnamaldehyde. For example, the composition comprises about 0.1 to about 3 wt. % vanillin or cinnamaldehyde. For example, the composition comprises about 0.1 to about 1 wt. % vanillin or cinnamaldehyde.

For example, the composition comprises about 0.01 to about 0.5 wt. % eugenol or clove leaf essential oil. For example, the composition comprises about 0.01 to about 0.3 wt. % eugenol or clove leaf essential oil. For example, the composition comprises about 0.01 to about 0.1 wt. % eugenol or clove leaf essential oil.

The composition further comprises at least one at least one bacterial fermentation product.

For example, the bacterial fermentation product is chosen from a *Bacillus* fermentation product, a *Streptomyces* fermentation product, an *Aspergillus* fermentation product, a *Streptococcus* fermentation product, a *Paenibacillus* fermentation product and mixtures thereof.

Various forms of the bacterial fermentation product are contemplated. For example, the product can be an extract or soluble, in liquid form or dehydrated.

For example, the at least one bacterial fermentation product is chosen from *Aspergillus aculeatus* fermentation solubles condensed, *Aspergillus niger* fermentation extract dehydrated, *Aspergillus niger* fermentation product dehydrated, *Aspergillus niger* fermentation product liquid, *Aspergillus niger* fermentation solubles dehydrated, *Aspergillus niger* fermentation solubles liquid, *Aspergillus niger* fermentation solubles meal extracted dehydrated, *Aspergillus oryzae* fermentation extract dehydrated, *Aspergillus oryzae* fermentation product dehydrated, *Aspergillus oryzae* fermentation product liquid, *Aspergillus oryzae* fermentation solubles dehydrated, *Aspergillus oryzae* fermentation solubles liquid condensed, *Aspergillus oryzae* fermentation solubles meal extracted dehydrated, *Bacillus acidopullulyticus* fermentation extract dehydrated, *Bacillus amyloliquefaciens* fermentation product liquid, *Bacillus amyloliquefaciens* fermentation solubles condensed, *Bacillus amyloliquefaciens* fermentation solubles liquid, *Bacillus* culture dehydrated, *Bacillus licheniformis* fermentation extract dehydrated, *Bacillus licheniformis* fermentation solubles dehydrated, *Bacillus licheniformis* fermentation solubles liquid, *Bacillus subtilis* fermentation extract dehydrated, *Bacillus subtilis* fermentation product dehydrated, *Bacillus subtilis* fermentation product liquid, *Bacillus subtilis* fermentation solubles dehydrated, *Bacillus subtilis* fermentation solubles liquid, *Streptococcus* culture dehydrated, *Streptomyces* fermentation presscake meal extracted, *Streptomyces* fermentation solids with solubles, liquid, *Streptomyces* fermentation solubles dehydrated, *Streptomyces* fermentation solubles extracted dehydrated, *Streptomyces* fermentation solubles meal extracted dehydrated, *Paenibacillus* fermentation solubles condensed, Liquid *Aspergillus niger* fermentation product, Liquid *Aspergillus niger* fermentation solubles, Liquid *Aspergillus oryzae* fermentation product, Liquid *Bacillus amyloliquefaciens* fermentation product, Liquid *Bacillus amyloliquefaciens* fermentation solubles, Liquid *Bacillus licheniformis* fermentation solubles, Liquid *Bacillus subtilis* fermentation product, Liquid *Bacillus subtilis* fermentation solubles, Liquid *Enterococcus faecium* fermentation product, Liquid *Lactobacillus acidophilus* fermentation product, Liquid *lactobacillus bul-*

*garicus* fermentation product, Liquid *Pichia pastoris* fermentation extract, Liquid *Saccharomyces* Fermentation Extract, Liquid *Schizosaccharomyces pombe* fermentation product, Liquid *Trichoderma longibrachiatum* fermentation product, Liquid *Trichoderma longibrachiatum* fermentation solubles, *Lactobacillus acidophilus* fermentation product dehydrated, *Lactobacillus acidophilus* fermentation product liquid, *Lactobacillus buchneri* fermentation product dehydrated, *Lactobacillus bulgaricus* fermentation product dehydrated, *Lactobacillus bulgaricus* fermentation product liquid, *Lactobacillus* culture dehydrated, *Lactococcus* culture dehydrated, Dried *Aspergillus niger* fermentation extract, Dried *Aspergillus niger* fermentation product, Dried *Aspergillus niger* fermentation solubles, Dried *Aspergillus oryzae* fermentation extract, Dried *Aspergillus oryzae* fermentation product, Dried *Aspergillus oryzae* fermentation solubles, Dried *Bacillus acidopullulyticus* fermentation extract, Dried *Bacillus licheniformis* fermentation extract, Dried *Bacillus licheniformis* fermentation solubles, Dried *Bacillus subtilis* fermentation extract, Dried *Bacillus subtilis* fermentation product, Dried *Bacillus subtilis* fermentation solubles, Condensed *Aspergillus aculeatus* fermentation solubles, Condensed *Aspergillus oryzae* fermentation solubles, liquid, Condensed *Bacillus amyloliquefaciens* fermentation solubles, Condensed *Paenibacillus* fermentation solubles, Condensed *Penicillium funiculosum* fermentation solubles, Condensed *Trichoderma reesei* 1391A fermentation solubles, and mixtures thereof.

For example, the *Bacillus* fermentation is an extract and is chosen from a *Bacillus amyloliquefaciens* fermentation extract, a *Bacillus subtilis* fermentation extract and mixtures thereof.

For example, the composition comprises a mixture of a *Streptomyces* fermentation extract, a *Bacillus amyloliquefaciens* fermentation extract and a *Bacillus subtilis* fermentation extract.

For example, the composition comprises about 0.1 to about 15 wt. % of the at least one bacterial fermentation product. For example, the composition comprises about 0.5 to about 10 wt. % of the at least one bacterial fermentation product. For example, the composition comprises about 1 to about 10 wt. % of the at least one bacterial fermentation product. For example, the composition comprises about 1 to about 5 wt. % of the at least one bacterial fermentation product.

For example, the composition comprises about 0.1 to about 5 wt. % of *Streptomyces* fermentation extract. For example, the composition comprises about 0.1 to about 3 wt. % of *Streptomyces* fermentation extract. For example, the composition comprises about 0.1 to about 1 wt. % of *Streptomyces* fermentation extract.

For example, the composition comprises about 0.1 to about 10 wt. % of *Bacillus* fermentation extract. For example, composition comprises about 1 to about 10 wt. % of *Bacillus* fermentation extract. For example, the composition comprises about 1 to about 5 wt. % of *Bacillus* fermentation extract.

The composition further comprises at least one plant extract.

For example, the at least one plant extract is chosen from a saponin extract, a *Yucca* extract, and mixtures thereof.
For example, the at least one plant extract is a saponin.
For example, the saponin is *Quillaja Saponaria*.
For example, the at least one plant extract is a *Yucca*.
For example, the *Yucca* is *Yucca Schidigera*.
For example, the composition comprises about 0.1 to about 5 wt. % of the at least one plant extract. For example, the composition comprises about 0.1 to about 3 wt. % of the at least one plant extract. For example, the composition comprises about 0.1 to about 2 wt. % of the at least one plant extract. For example, the composition comprises about 0.1 to about 1 wt. % of the at least one plant extract.

In some embodiments, the composition comprises a controlled release matrix.

For example, the controlled release matrix is chosen from silica, silicic acid, calcium carbonate, limestone, oil, animal fat, yeast extract, palmitic acid, stearic acid and mixtures thereof. For example, the controlled release matrix is an oil.

Components of the matrix are also referred to herein as additives. Accordingly, it will be understood that other additives that may improve the quality of the compositions, enhance shelf-life, prevent microbial spoilage and/or autoxidation are presently contemplated. In some embodiments, the controlled release lipid matrix may in addition aid in improving the feed digestion and/or feed conversion.

For example, the controlled release matrix is a controlled release lipid matrix.

For example, the controlled release matrix is a controlled release polysaccharide matrix or other non-lipid matrix.

For example, the oil is vegetable oil, optionally hydrogenated vegetable oil, and optionally chosen from soya oil, rapeseed oil, palm oil, sunflower oil, chea oil, corn oil and mixtures thereof.

For example, the controlled release matrix is or comprises a yeast extract.

For example, the yeast extract is chosen from yeast culture, yeast cell extract and mixtures thereof.

For example, the composition comprises about 10 to 90 wt. % of the matrix. For example, the composition comprises about 10 to 90 wt. % of the matrix. For example, the composition comprises about 20 to 80 wt. % of the matrix. For example, the composition comprises about 30 to 70 wt. % of the matrix. For example, the composition comprises about 30 to 60 wt. % of the matrix. For example, the composition comprises about 40 to 50 wt. % of the matrix.

For example, the composition comprises about 1 to 20 wt. % of calcium carbonate or limestone. For example, the composition comprises about 1 to 15 wt. % of calcium carbonate or limestone. For example, the composition comprises about 1 to 10 wt. % of calcium carbonate or limestone.

For example, the composition comprises about 1 to 20 wt. % of silica or silicic acid. For example, the composition comprises about 1 to 15 wt. % of silica or silicic acid. For example, the composition comprises about 1 to 10 wt. % of silica or silicic acid.

For example, the composition comprises about 0.01 to about 5 wt. % of the yeast extract. For example, the composition comprises about 0.01 to about 3 wt. % of the yeast extract. For example, the composition comprises about 0.01 to about 1 wt. % of the yeast extract. For example, the composition comprises about 0.01 to about 0.1 wt. % of the yeast extract.

For example, the composition comprises about 1 to 40 wt. % of palmitic acid or stearic acid. For example, the composition comprises about 1 to 20 wt. % of palmitic acid or stearic acid. For example, the composition comprises about 1 to 10 wt. % of palmitic acid or stearic acid.

For example, the composition comprises about 10 to 70 wt. % of oil or animal fat. For example, the composition comprises about 20 to 60 wt. % of oil or animal fat. For example, the composition comprises about 30 to 50 wt. % of oil or animal fat.

For example, the mixture comprises about 60 to 90 wt % of the first composition. For example, the mixture comprises about 70 to 90 wt % of the first composition. For example, the mixture comprises about 75 to 85 wt % of the first composition.

For example, the mixture comprises about 5 to 25 wt. % of the second composition. For example, the mixture comprises about 10 to 20 wt. % of the second composition. For example, the mixture comprises about 12 to 18 wt. % of the second composition.

For example, the mixture comprises about 1 to 15 wt. % of the third composition. For example, the mixture comprises about 2 to 12 wt. % of the third composition. For example, the mixture comprises about 3 to 10 wt. % of the third composition.

The compositions and compositions comprised in mixtures described herein may be formulated for example into prills, using known techniques, for example as described in US Patent Publication Number US20160302450A1, herein incorporated by reference by its entirety. As reported therein, prills are found to be palatable to cows.

The compounds recited in the compositions and mixtures described herein may be encapsulated or microencapsulated, for example using a controlled release matrix, such as the controlled release lipid matrix as described in US Patent Publication Number US20210307365A1, herein incorporated by reference in its entirety. Encapsulation or microencapsulation of feed ingredients and components allows for their assimilation by the ruminant (e.g. cow) post-ruminally without being altered by the micro-organisms of the rumen.

For example, each of the first composition, the second composition and the third composition are separately prilled or encapsulated and then mixed together to form the mixture herein disclosed. Alternatively, prilling or encapsulating together all three compositions is also contemplated.

As demonstrated, the compositions and mixtures herein disclosed may be used in ruminants to improve milk productivity, in terms of yield and components thereof. The compositions and mixtures were also found to improve gut health and rumen function in cows.

Accordingly, another aspect relates to the use of the compositions or mixtures for improving gut health, optionally rumen function and/or microflora balance, in a ruminant.

Another aspect relates to the use of the compositions or mixtures for improving milk production in a ruminant.

Another aspect relates to a method of improving gut heath and/or milk production in a ruminant, the method comprising administering to the ruminant a composition mixture herein disclosed.

For example, the ruminant is a cow. For example, the cow is in transition period.

For example, the composition is administered to the cow as of about 3 weeks prior to calving.

For example, the composition is administered to the cow until the calf reaches about 30 days of milk.

For example, the composition or mixture is administered to the ruminant at a dose of about 5 g/day to 50 g/day, about 5 g/day to 40 g/day, about 5 g/day to 30 g/day, about 5 g/day to 20 g/day or about 10 g/day.

For example, as demonstrated in Example 1, the method is for reducing the risk of onset of subclinical ketosis during early lactation period e.g. week 1 or week 2 post-calving.

For example, the ruminant having received the composition or mixture has an increased daily milk yield of about 5 to 20% relative to a control ruminant that did not receive the composition or mixture.

For example, the ruminant having received the composition or mixture has an increased milk protein content of about 5 to 20% relative to a control ruminant that did not receive the composition or mixture.

For example, the ruminant having received the composition or mixture has an increased daily rumination time of about 5 to 10% relative to a control ruminant that did not receive the composition or mixture.

For example, the ruminant having received the composition or mixture has an increased daily rumination time by about 20 to about 60 minutes, optionally about 30 to about 50 minutes, relative to a control ruminant that did not receive the composition or mixture.

The above disclosure generally describes the present application. A more complete understanding can be obtained by reference to the following specific examples. These examples are described solely for the purpose of illustration and are not intended to limit the scope of the application. Changes in form and substitution of equivalents are contemplated as circumstances might suggest or render expedient. Although specific terms have been employed herein, such terms are intended in a descriptive sense and not for purposes of limitation.

The examples detailed below are non-limitative and are used to better exemplify the methods of the present disclosure.

EXAMPLES

Example 1

A mixture of organic acids, essential oils, fermentation extracts and plant extracts was assessed for its effect on performance and metabolic indicators of cows during their transition period (about 60 days before calving to about 30 days after calving). It is believed that by bypassing the rumen, the test composition may positively impact the intestinal microbiota and achieve a better performance through an optimal digestion.

Animals and Feeding:

31 Holstein cows in the close-up period (about 3 weeks prior to calving) were included based on anticipated calving dates. Lactating cows received a typical Northeastern total mixed ration (TMR) which consisted of corn silage, haylage, high-moisture corn, protein supplement, and minerals and vitamins. The dry cows received a TMR which consisted of dry hay, straw, silage, and mineral and vitamins. The TMRs were given twice daily.

16 cows received the placebo and 15 cows received the test composition. Both groups were balanced in terms of number of lactations for each COW.

Enrolled cows received the placebo (16 cows) or test composition (15 cows) from about 21 days prior to expected calving date, until the last calved cows in each group (treatment or placebo) reached 30 days in milk. In the test group, the cows received 10 g per day of the Test composition which was mixed with soybean meal as a carrier and added directly to the TMR, in both close-up and fresh cows. The placebo consisted of soybean meal carrier only.

The test composition is a mixture of 3 different prilled products:

1) Organic acid and Essential oils for Ruminant, composed of: Fumaric acid, Sorbic acid, Citric acid, Malic acid, Thymol, Eugenol, Vanillin and Technological additives (Silica, Calcium carbonate, Hydrogenated Vegetable Oil)
2) Fermentation products, composed of: *Bacillus amyloliquefaciens* fermentation solubles, *Bacillus subtilis* fermentation extracts dehydrated, *Streptomyces* fermentation solubles, dehydrated and Technological additives (Silica, Calcium carbonate, Hydrogenated Vegetable Oil)

3) Plant extracts, composed of: *Quillaia* extracts (saponins) and Technological additives (Maltodextrine, Yeast culture, Palmitic acid)

The components of the Test composition are detailed in Table 1 below, and components of individual products are detailed in Tables 2, 3 and 4 below.

TABLE 1

Components of the Test composition

| Formula for 1 Kg | | | | Concentration |
|---|---|---|---|---|
| in Kg | in g | % | Raw material | (g/Kg) |
| 0.0750 Kg | 75.00 g | 7.50% | Sorbic Acid (organic acid) | 74.25 g/Kg |
| 0.1267 Kg | 126.67 g | 12.67% | Fumaric acid (organic acid) | 125.40 g/Kg |
| 0.0600 Kg | 60.00 g | 6.00% | Malic acid (organic acid) | 59.40 g/Kg |
| 0.0600 Kg | 60.00 g | 6.00% | Citric acid (organic acid) | 59.40 g/Kg |
| 0.0033 Kg | 3.27 g | 0.33% | Thymol (essential oil) | 3.23 g/Kg |
| 0.0039 Kg | 3.86 g | 0.39% | Vanillin (essential oil) | 3.83 g/Kg |
| 0.0005 Kg | 0.54 g | 0.05% | Eugenol (essential oil) | 0.53 g/Kg |
| 0.0550 Kg | 55.00 g | 5.50% | Calcium Carbonate (additive - matrix protection for rumen bypass) | 55 g/Kg |
| 0.0800 Kg | 80.00 g | 8.00% | Silica (additive - matrix protection for rumen bypass) | 80 g/Kg |
| 0.0048 Kg | 4.80 g | 0.48% | Streptomyces fermentation solubles dehydrated | 192 UI/g |
| 0.0281 Kg | 28.13 g | 2.81% | Bacillus amyloliquefaciens fermentation solubles condensed « A » | 23 UI/g |
| 0.0060 Kg | 6.00 g | 0.60% | Bacillus subtilis fermentation extract dehydrated « B » | 4 UI/g |
| 0.0030 Kg | 3.00 g | 0.30% | Bacillus subtilis fermentation extract dehydrated « C » | 240 UI/g |
| 0.0030 Kg | 3.00 g | 0.30% | Quillaja saponaria powder | 3 g/Kg |
| 0.0005 Kg | 0.50 g | 0.05% | Yeast Culture Dehydrated | |
| 0.0465 Kg | 46.50 g | 4.65% | Palmitic acid (additive - matrix protection for rumen bypass) | |
| 0.4437 Kg | 443.74 g | 44.37% | Hydrogenated vegetable oil (from Palm oil) (additive - matrix protection for rumen bypass) | 443.74 g |
| 1.000 Kg | 1,000 g | 100% | Total | |

TABLE 2

Components of Component 1 (Organic acids and essential oils)

| Component 1 (counts for 80% of the Test composition mixture) | % as single ingredient |
|---|---|
| Fumaric acid | 15.83 |
| Sorbic acid | 9.38 |
| Citric acid | 7.50 |
| Malic acid | 7.50 |
| Silicon dioxide | 5.00 |
| Calcium Carbonate | 5.00 |
| Thymol | 0.41 |
| Vanilin | 0.48 |
| Eugenol | 0.07 |
| Hydrogenated vegetable oil (from Palm oil) (additive - matrix protection for rumen bypass) | 48.84 |
| | 100.00 |

TABLE 3

Components of Component 2 (Fermentation products)

| Component 2 (counts for 15% of the Test composition mixture) | % as single ingredient |
|---|---|
| Silicon Dioxide | 5.00% |
| Calcium Carbonate | 10.00% |
| Streptomyces fermentation solubles dehydrated | 3.20% |
| Bacillus amyloliquefaciens fermentation solubles condensed « A » | 18.75% |
| Bacillus subtilis fermentation extract dehydrated « B » | 4.00% |
| Bacillus subtilis fermentation extract dehydrated « C » | 2.00% |
| Hydrogenated vegetable oil (from Palm oil) (additive - matrix protection for rumen bypass) | 57.05% |
| | 100.00% |

TABLE 4

Components of Component 3 (Plant extracts)

| Component 3 (counts for 5% of the Test composition mixture) | % as single ingredient |
|---|---|
| Quillaja saponaria powder | 6.00% |
| Yeast Culture Dehydrated | 1.00% |
| Palmitic acid (additive - matrix protection for rumen bypass) | 47.00% |
| Hydrogenated vegetable oil (from Palm oil) (additive - matrix protection for rumen bypass) | 46.00% |
| | 100.00% |

Measurements

Cows were milked by Lely robots and milk yield, milk fat, milk protein, milk lactose and milk somatic cell count (SCC) were recorded daily.

Blood beta-hydroxybutyric acid (BHBA) level was measured on Day −21, −7, +7, and +21 relative to calving, using the Precision Xtra™ meter (Abbott Diabetes Care, Saint-Laurent, QC, Canada).

The body condition score (BCS) was assessed using a scale from 1 to 5 (Edmonson et al., 1989, Journal of Dairy Science. 72:68-78) on Day −21, −7, +7 & +21 by two independent, double-blinded technicians.

Rumination time was recorded continuously.

Ambient temperature and humidity were recorded daily.

Data Summarization and Statistical Analysis

Two cows were excluded due for health reasons (cow 85 and 45) and two cows were excluded because a minimum of 25 days of milk records was not obtained. Milk records from Days 1 to 4 of lactation were incomplete or inconsistent for most cows, as is expected with robotic milking systems, and were removed across all cows. Accordingly, data from 13 placebo cows and 15 test cows were included.

Milk and component data were analyzed using Proc Mixed of SAS 9.4 (SAS, 2011). The model included group or period (placebo, test) as the fixed effect. Cow was considered as a repeated subject with CS structure. Somatic cell count (SCC) values were log-transformed before analysis. Fat-corrected milk (FCM) was computed using the Lely system and energy-corrected milk (ECM) was computed as follows: ECM=milk yield×[(fat %×383)+ (protein %×242)+ 783.2]/2140. BCS and BHBA data were analyzed using group or period (placebo, test), day of sampling (d−21, d−7, d+7, d+21), and their interaction as the fixed effect. Cow was considered a repeated measure.

Results

Milk Yield and Corrected Milk Yields

The assessed parameters relating to milk yield and milk components are shown in Table 5 below. Milk yield parameters are illustrated in FIG. 1.

As can be seen, cows that received the Test composition had a greater milk yield, fat-corrected milk (FCM) yield, and energy-corrected milk (ECM) yield (P<0.1) compared to cows that received the placebo. Without wishing to be bound by this theory, this finding supports that the cows having received the Test composition had a greater nutrient output through their gastrointestinal tract due, in part, to improved overall nutrient degradability and utilization.

Cows that received the Test composition had also significantly greater milk protein yield (Table 5), which in turn reflected a greater available metabolizable energy and protein contents.

TABLE 5

Measured parameters in control and test cows

| | Control | Test | Pooled SE | P value |
|---|---|---|---|---|
| Milk yield, kg/d | 47.07 | 54.84 | 1.74 | 0.004 |
| FCM yield, kg/d | 53.34 | 60.53 | 2.65 | 0.063 |
| ECM yield, kg/d | 53.29 | 60.51 | 2.67 | 0.068 |
| Fat, kg/d | 2.44 | 2.66 | 0.18 | 0.400 |
| Protein, kg/d | 1.53 | 1.87 | 0.06 | 0.001 |
| Fat, % | 5.23 | 4.95 | 0.30 | 0.510 |
| Protein, % | 3.26 | 3.42 | 0.04 | 0.012 |
| Lactose, % | 6.01 | 6.01 | 0.02 | 0.892 |
| Log SCC | 3.86 | 3.60 | 0.19 | 0.343 |
| Rumination time, min/d | 454 | 494 | 13 | 0.032 |

Rumination Time

Cows that received the Test composition ruminated 40 minutes more per day in compared to cows that received the placebo, as shown in Table 5. Indeed it has been shown that rumination time is a reliable measure of ruminal function (fibre degradation) (Beauchemin, K. A. 2018. Journal of Dairy Science. 101:4762-4784).

Beta-Hydroxybutyric Acid (BHBA) and Body Condition Score (BCS) Parameters

Tissue mobilization occurs during the onset of lactation because nutrient output in the milk exceeds nutrient intake. However, excess mobilization indicates a severe negative energy balance and may predispose cows to health issues. Excessive mobilization and subsequent utilization of body fat reserves can lead to the accumulation of ketone bodies such as Beta-hydroxybutyric acid (BHBA) and thus increased risk of subclinical ketosis (BHBA>1.2 mmol/liter) which can lead to decreased nutrient intake and health complications.

The BSC is a subjective method of assessing the amount of metabolizable energy stored in fat and muscle (body reserved) on a live animal. BSC on dairy cows is performed to a 1 to 5 scale. The method involves palpating cows to assess the amount of tissue under the skin.

BSC decrease and BHBA elevation are usually coordinated (higher mobilization leads to a higher BHBA levels). The risk of subclinical ketosis is at its greatest the first week post calving and decreases gradually in the second or third weeks post calving as cows are able to recover from inflammation, disposal of placenta, risk of infection post calving and be able to consume more feed. Accordingly, effective interventions to improve the health of cows during their transition period, especially in the first week post calving, is of particular importance.

Figure 2:
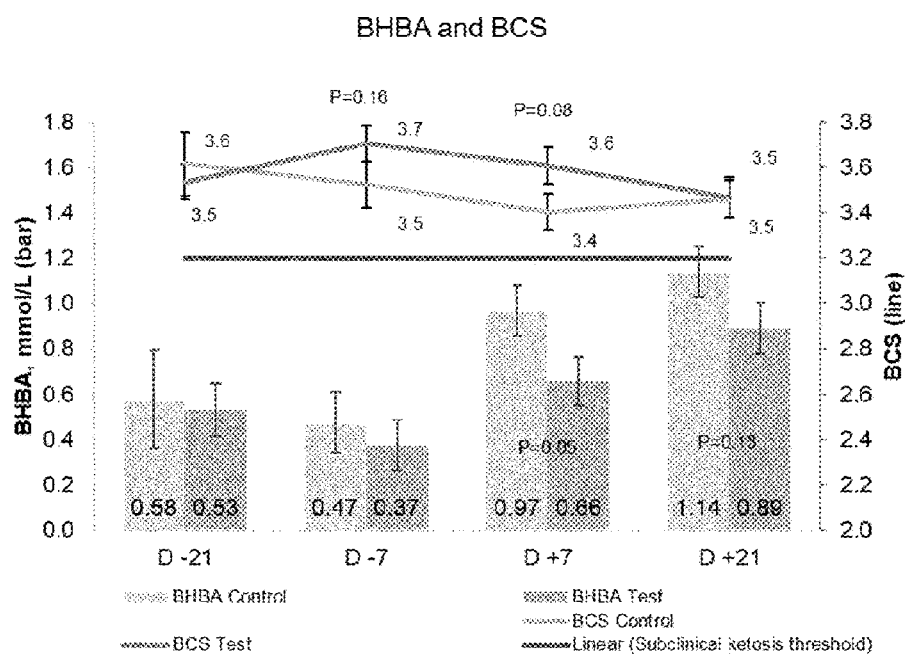
FIG. 2 is a combined bar and line graph showing Beta-hydroxybutyric acid (BHBA) and the Body Condition Score mean levels in test vs control cows, at Day −21, −7, +7, and +21 relative to calving. The red line denotes the threshold of subclinical ketosis of 1.2 mmol/L.

As demonstrated in FIG. 2, cows that received the Test composition had a higher BCS on Day 7 post-calving which was associated with lower BHBA concentration. Additionally, the blood BHBA level for the placebo cows on Day +21 was 1.14±0.11, which was not statistically significantly different from 1.2 mmol/l, the point set as the threshold for subclinical ketosis (Duffield, T. F., et al. 2009. Journal of Dairy Science. 92:571-580), as denoted by a solid line. Hence, the control cows were predisposed to the risk of subclinical ketosis at a greater rate compared with the test cows. Cows will continue to lose body condition as they process in lactation (about 1 BSC) up to about 60 days in milk but will have a lower risk of developing subclinical ketosis. At a later stage, the body condition is influence by ration formal, density, environment etc.

Somatic Cell Count

Somatic cell counts were not different between placebo and test cows (data not shown), indicating that the Test composition did not have an impact on the infectious status of the udder.

Nutrient Count in Dry and Lactating Rations

The variation in the nutrient content of the offered feed during the pre-calving period (dry ration) or the post-calving period (lactating ration) was minimal and did not affect the results (data not shown).

In conclusion, supplementing with the Test composition which comprises a blend of organic acids, essential oils, fermentation and plant extracts was found to improve gastrointestinal function as indicated by improved productivity (milk yield), metabolic health (BHBA and BCS), and rumen function (rumination time). This intervention is expected to positively improve cows' well-being, longevity, and economical return during the transition period.

The invention claimed is:

1. A mixture, comprising:
   (a) a first composition comprising organic acids comprising fumaric acid, sorbic acid, citric acid, and malic acid, or salts thereof, essential oils comprising thymol, eugenol and vanillin, and optionally a first controlled release matrix;
   (b) a second composition comprising bacterial fermentation products comprising a *Bacillus amyloliquefaciens* fermentation extract, a *Bacillus subtilis* fermentation extract and a *Streptomyces* sp. fermentation extract, and optionally a second controlled release matrix; and
   (c) a third composition comprising a plant extract comprising a saponin, and
   (d) optionally a third controlled release matrix.

2. The mixture of claim 1, wherein the mixture comprises about 60 to 90 wt % of the first composition.

3. The mixture of claim 1, wherein the mixture comprises about 70 to 90 wt % of the first composition.

4. The mixture of claim 1, wherein the mixture comprises about 75 to 85 wt % of the first composition.

5. The mixture of claim 1, wherein the mixture comprises about 5 to 25 wt. % of the second composition.

6. The mixture of claim 1, wherein the mixture comprises about 1 to 15 wt. % of the third composition.

7. The mixture of claim 1, wherein the saponin is derived from *Quillaja saponaria*.

8. The mixture of claim 1, wherein the controlled release matrix is chosen from silica, silicic acid, calcium carbonate, limestone, oil, animal fat, yeast extract, palmitic acid, stearic acid, maltodextrin and mixtures thereof.

9. The mixture of claim 8, wherein the controlled release matrix is a yeast extract.

10. The mixture of claim 9, wherein the yeast extract is chosen from yeast culture, yeast cell extract and mixtures thereof.

11. The mixture of claim 1, wherein the first composition comprises about 10 to about 60 wt. % of the organic acids.

12. The mixture of claim 1, wherein the first composition comprises about 20 to about 40 wt. % of the organic acids.

13. The mixture of claim 1, wherein the first composition comprises about 1 to about 20 wt. % of sorbic acid or potassium sorbate.

14. The mixture of claim 1, wherein the first composition comprises about 5 to about 10 wt. % of sorbic acid or potassium sorbate.

15. The mixture of claim 1, wherein the first composition comprises about 1 to about 40 wt. % of fumaric acid.

16. The mixture of claim 1, wherein the first composition comprises about 5 to about 20 wt. % of fumaric acid.

17. The mixture of claim 1, wherein the first composition comprises about 1 to about 20 wt. % of malic acid.

18. The mixture of claim 1, wherein the first composition comprises about 5 to about 10 wt. % of malic acid.

19. The mixture of claim 1, wherein the first composition comprises about 1 to about 20 wt. % of citric acid or formic acid.

20. The mixture of claim 1, wherein the first composition comprises about 5 to about 10 wt. % of citric acid or formic acid.

21. The mixture of claim 1, wherein the second composition comprises about 0.1 to about 15 wt. % of the bacterial fermentation products.

22. The mixture of claim 1, wherein the second composition comprises about 0.1 to about 5 wt. % of *Streptomyces* sp. fermentation extract.

23. The mixture of claim 1, wherein the second composition comprises about 0.1 to about 10 wt. % of fermentation extracts from *Bacilli* spp.

* * * * *